United States Patent
Lin

(10) Patent No.: US 8,254,963 B2
(45) Date of Patent: Aug. 28, 2012

(54) METHOD OF PROVIDING LOCATION-BASED SERVICE IN A COMMUNICATION SYSTEM

(76) Inventor: Hsiu-Ping Lin, Taipei (TW)

( * ) Notice: Subject to any disclaimer, the term of this patent is extended or adjusted under 35 U.S.C. 154(b) by 918 days.

(21) Appl. No.: 12/186,689

(22) Filed: Aug. 6, 2008

(65) Prior Publication Data

US 2009/0156233 A1    Jun. 18, 2009

(30) Foreign Application Priority Data

Aug. 6, 2007    (TW) .............................. 96128917 A

(51) Int. Cl.
*H04W 24/00* (2009.01)

(52) U.S. Cl. ................. 455/456.3; 455/456.1; 455/456.2

(58) Field of Classification Search ............... 455/412.1, 455/414.1, 418–420, 456.1–456.6, 466, 517–519
See application file for complete search history.

(56) References Cited

U.S. PATENT DOCUMENTS

| | | | | |
|---|---|---|---|---|
| 7,616,964 B2 * | 11/2009 | Riise et al. | ................. | 455/456.1 |
| 2004/0162089 A1 * | 8/2004 | Fan et al. | .................. | 455/456.3 |
| 2006/0079247 A1 * | 4/2006 | Ritter | ......................... | 455/456.1 |
| 2007/0032247 A1 * | 2/2007 | Shaffer et al. | .............. | 455/456.1 |
| 2007/0111712 A1 * | 5/2007 | Ratnakar | .................... | 455/414.1 |
| 2008/0096592 A1 * | 4/2008 | Waytena et al. | ............. | 455/466 |
| 2009/0005066 A1 * | 1/2009 | Florkey et al. | ............. | 455/456.1 |

\* cited by examiner

*Primary Examiner* — Brandon Miller

(74) *Attorney, Agent, or Firm* — Smith Moore Leatherwood LLP

(57) ABSTRACT

A location-based service method may include receiving a plurality of data through a first communication equipment, wherein each of the plurality of data is related to an indicator, the indicator being configured to indicate if the data is related to the location of a provider of the data, receiving a query through the first communication equipment or a second communication equipment located closely to the first communication equipment, and searching the plurality of data to find data related to the location of the provider and also related to the query to form a search result related to the query.

5 Claims, 7 Drawing Sheets

METHOD OF PROVIDING LOCATION-BASED SERVICE IN A COMMUNICATION SYSTEM

CROSS REFERENCE TO RELATED APPLICATION

This application claims the priority of Taiwanese Application No. 096128917, entitled "LOCATION-BASED SERVICE IN A COMMUNICATION SYSTEM," filed Aug. 6, 2007.

BACKGROUND OF THE INVENTION

The present invention relates to location-based service. More particularly, the present invention relates to a location-based service related to information or data searching around users.

Conventionally, people desire to know information related to surroundings. Location-based services are therefore happened on the Internet, WiFi or WiMax network, or other kinds of cellular networks. The conventional location-based services may position a user to get his/her location through various methods, such as GPS, AGPS and/or the third generation positioning, and provides daily information, travel information or advertisement information related to the user's location to the user. These kinds of conventional location-based services are usually provided by a system provider, for example, an operator of a cellular network who collects or stores these information and transmits these information through its communication system, or a location-based service provider, for example, a content provider such as a website who collects or generates these kinds of information.

As the amount of location-based information grows up, when a user want to get information he/she needs, to search for the information based on a query (probably including a keyword) and his/her location may become more and more important. However, to get a user's location, conventional positioning methods may include GPS or AGPS, a cellular network positioning including 3G and 3.5G, or a wireless network positioning. A PC, a laptop, a cellular phone, a GPS navigator, a personal digital assistant or other mobile terminals capable of being positioning may firstly be positioned to get the user's location, and then the user can use the abovementioned mobile terminals to get a location-based service he/she needs.

However, to position the abovementioned mobile terminals may cause delay before providing the location-based service (i.e. the location-based service is provided after the terminals are positioned). Moreover, much overhead such as to ranging the mobile terminals, to handshake with the system of the system provider, etc, may occur when running the location-based service through the system provider, the location-based service provider and the mobile terminals.

It may therefore be desirable to have a method of providing a location-based service which solve or eliminate problems or disadvantages as mentioned above, to facilitate users to search and/or get information about his/her surroundings.

BRIEF SUMMARY OF THE INVENTION

Examples of the present invention may provide a location-based service method. The location-based service method may include receiving a plurality of data through a first communication equipment, wherein each of the plurality of data is related to an indicator, the indicator being configured to indicate if the data is related to the location of a provider of the data, receiving a query through the first communication equipment or a second communication equipment located closely to the first communication equipment, and searching the plurality of data to find data related to the location of the provider and also related to the query to form a search result related to the query.

Some examples of the present invention may provide a location-based service. The location-based service may include receiving a data and an indicator through a third communication equipment, wherein the data is related to the indicator and the indicator is configured to indicate if the data is related to the location of a provider of the data, transmitting the data and the indicator to a location-based service provider, receiving a query through the third communication equipment or a fourth communication equipment located closely to the third communication equipment, transmitting the query to the location-based service provider, and transmitting a search result related to the query to a user through the third communication equipment or the fourth communication equipment, wherein the search result is formed by searching a plurality of data received by the third equipment to find data related to the location of the provider and also related to the query.

Examples of the present invention may also provide a location-based service method. The location-based service method may include providing a data related to an indicator, configuring the indicator to point out the data is related to the location of a provider of the data if the data is related to the location of a provider of the data, and transmitting the data and the indicator to a server through a fifth communication equipment to store the data in the server for a user to transmit a query to search the data related to the location of the provider of the data through the fifth communication equipment or a sixth communication equipment located closely to the fifth communication equipment.

Other examples of the present invention may provide a location-based service method in a communication system. The communication system may include a plurality of base stations, relay stations and mobile stations, wherein each of the plurality of base stations is capable of assigning address information to each relay station and mobile station located in its cell to make each relay station and mobile station located in its cell having its unique address information. The method may include receiving a first data and a first address information related to a first relay station or a mobile station which a provider of the first data used to upload the first data to form a second data if the first data is related to the location of the provider of the first data, storing the second data into a location-based service server, wherein the location-based service server stores a plurality of the second data, receiving a query sent by a second mobile station and a second address information related to the second mobile station information through a second base station, searching the plurality of the second data to find data which is related to the query and its first address information is related to the second address information to form a search result, and transmitting the search result to the mobile station.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 1:
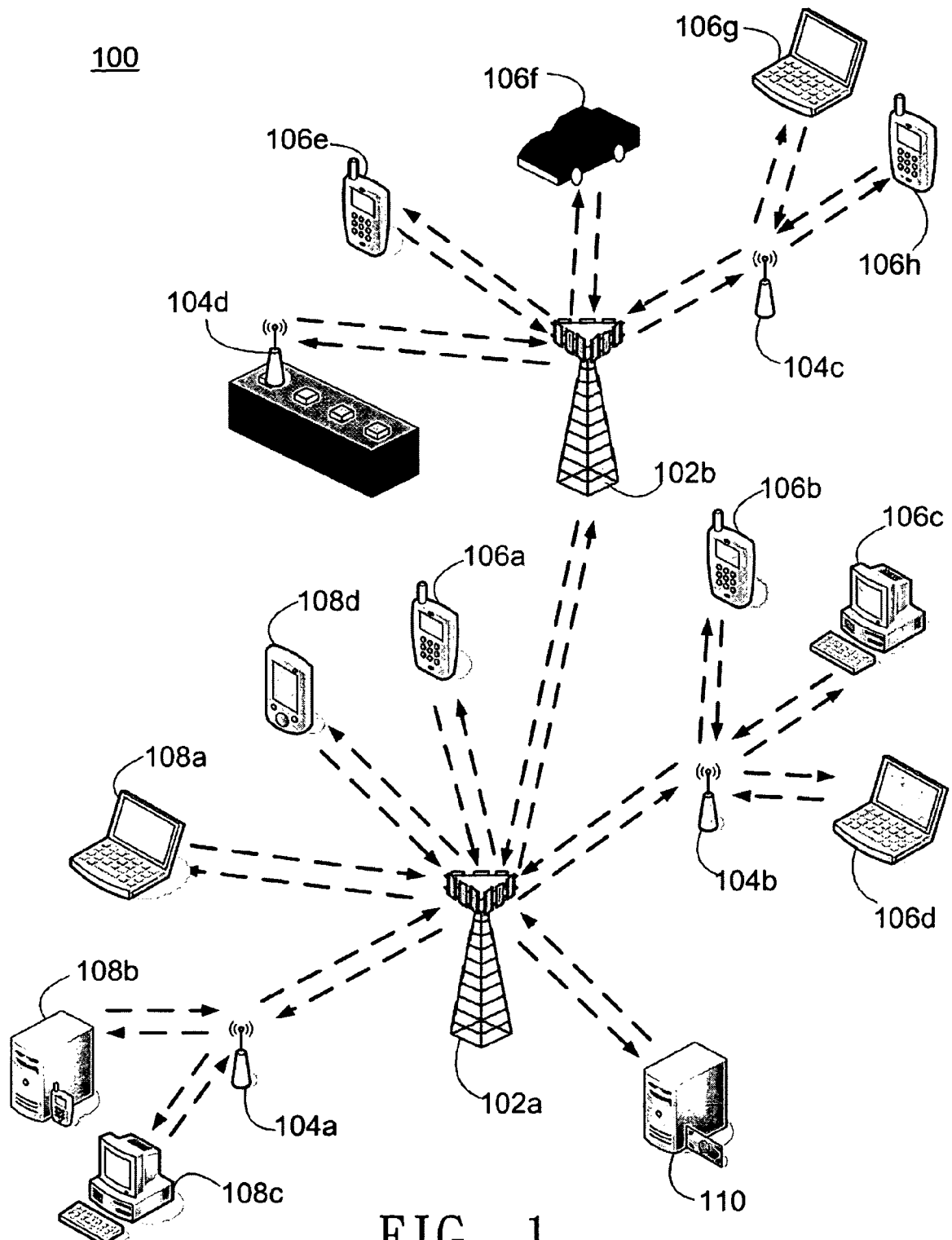
FIG. 1 is a diagram illustrating a communication system according to an example of the present invention.

FIG. 1 is a diagram illustrating a communication system 100 according to an example of the present invention. Referring to FIG. 1, the communication system 100 may include base stations 102a and 102b, relay stations 104a, 104b, 104c and 104d, mobile stations 106a, 106b, 106c, 106d, 106e, 106f, 106g and 106h, data providers 108a, 108b, 108c and 108d, and a location-based service provider 110. The mobile stations 106a, 106b, 106c, 106d, 106e, 106f, 106g or 106h is capable of communicating with the location-based service provider 110 to get a location-based service, wherein the mobile stations 106a, 106b, 106e or 106h may comprise a hand-held mobile device including a cellular phone or a navigator capable of communicating with the base stations 102a or 102b, or the relay stations 104a, 104b, 104c or 104d. The mobile stations 106d or 106g may include a laptop capable of communicating with the base stations 102a or 102b, or the relay stations 104a, 104b, 104c or 104d. The mobile station 106c may include a personal computer capable of communicating with the base stations 102a or 102b, or the relay stations 104a, 104b, 104c or 104d. The mobile station 106f may further include an electronic equipment of vehicles such as a car computer capable of communicating with the base stations 102a or 102b, or the relay stations 104a, 104b, 104c or 104d. The data providers 108a, 108b, 108c or 108d may include a hand-held mobile device, a laptop, a PC, a car computer or a server capable of communicating with the base stations 102a or 102b, or the relay stations 104a, 104b, 104c or 104d. The location-based service provider 110 may include a server capable of communicating with the base stations 102a or 102b, or the relay stations 104a, 104b, 104c or 104d. In one example, a query of a user is transmitted to the base station through the mobile station 106a. Later, the query may be transmitted to the location-based service provider 110. In another example, a query of a user may be transmitted to the relay station 104a through the mobile station 106b, 106c or 106d, and then passed to the base station 102a through the relay station 104b. Later, the base station 102a may transmit the query to the location-based service provider 110. In still another example, a query of a user may be transmitted to the relay station 104c through the mobile station 106e, 106f, 106g or 106h, and then passed to the base station 102b through the relay station 104c. Next, the base station 102b may pass the query to the base station 102a, and then the base station 102a may transmit the data to the location-based service provider 110.

In one example, the relay stations 104a, 104b or 104c may be a fixed relay station having fixed location. In another example, the relay station 104d may also be a mobile relay station equipped or mounted in/on a train or a bus and thus moves when the train or the bus moves. Similarly, data of the data provider 108a or 108b may be transmitted to the base station 102a, and then been passed to the location-based service provider 110 through the base station 102a. Moreover, in other example, data of the data provider 108b or 108c may also be transmitted to the relay station 104a firstly, and then be transmitted to the base station 102a through the relay station 104a, and finally been passed to the location-based service provider 110 through the base station 102a.

Figure 2:
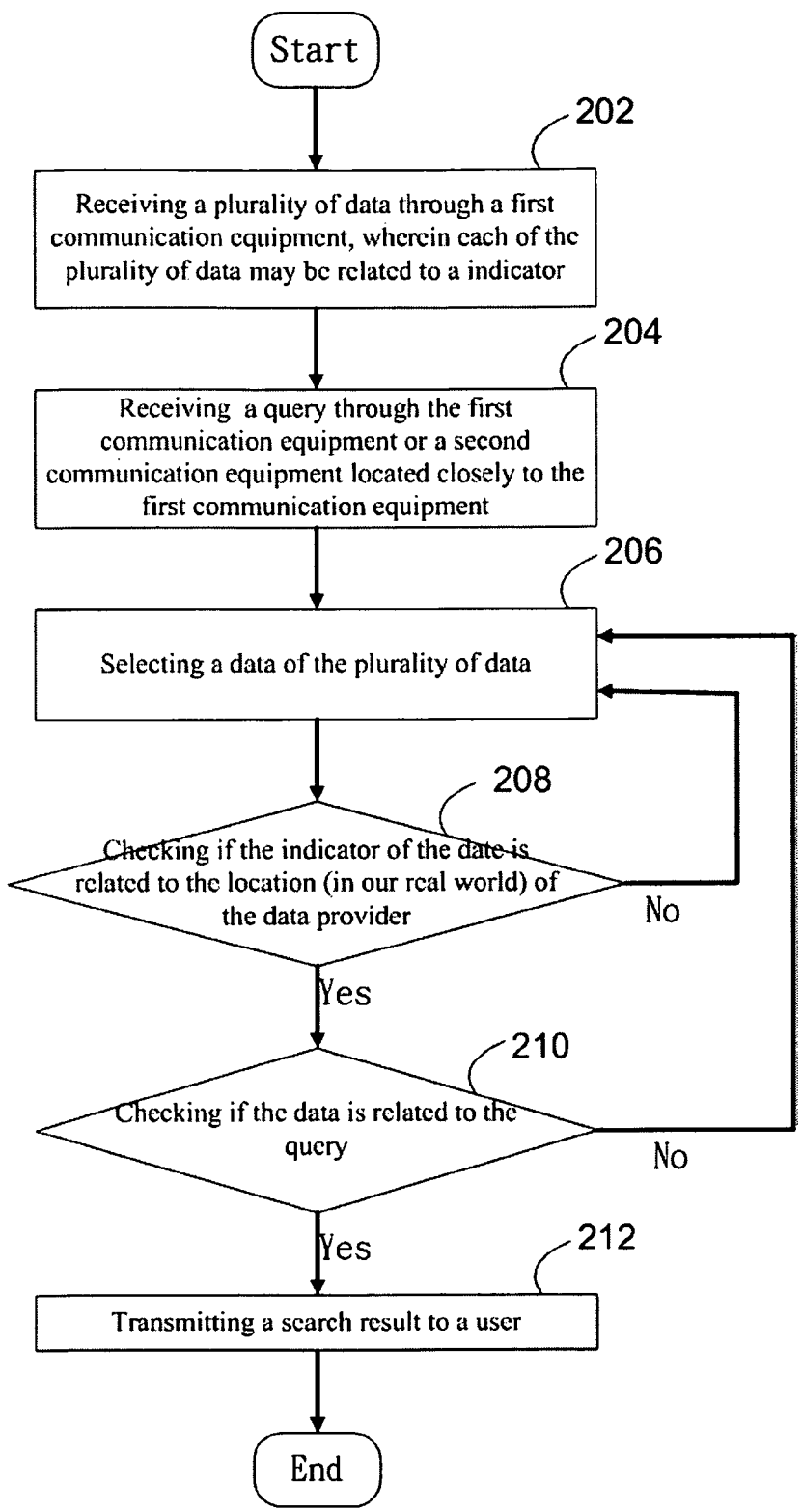
FIG. 2 is a flowchart illustrating a method of providing a location-based service according to an example of the present invention.

FIG. 2 is a flowchart illustrating a method of providing a location-based service according to an example of the present invention. Referring to FIG. 2, at step 202, a location-based service provider may receive a plurality of data through a first communication equipment, wherein each of the plurality of data may be related to a indicator. At step 204, the location-based service provider may receive a query through the first communication equipment or a second communication equipment located closely to the first communication equipment. Next, at step 206, the location-based service provider may select a data of the plurality of data. At step 208, the location-based service provider may check if the indicator of the date is related to the location (in our real world) of the data provider. If yes, goes to step 210, and returns to step 206. At step, 210, the location-based service provider may check if the data is related to the query. If yes, goes to step 212, and returns to step 206. Finally, at step 212, the data may be transmitted to a hand-held mobile device (a user) as a search result related to the query. Therefore, steps 206, 208 and 210 are steps of finding the data which the indicator of the data is related to the location of the data provider and the data is related to the query to form the search result. The first communication equipment or the second communication equipment located closely to the first communication equipment may include a base station, a relay station, a subscriber station and/or a mobile station, wherein the second communication equipment may be located in the same cell, the same group and/or the same range of the light-of-sight (LOS) of the first communication equipment. In one example, the query such as a keyword may be formed by editing through an input method or transforming through a voice input. In another example, the query may be formed by selecting a plurality of choices provided by the location-based service provider for a user to select at least one of the plurality of the choices to form the query. Moreover, the location-based service provider may firstly store data whose related indicator indicating the data is related to the location of the provider of the data into a location-based service server.

Figure 3:
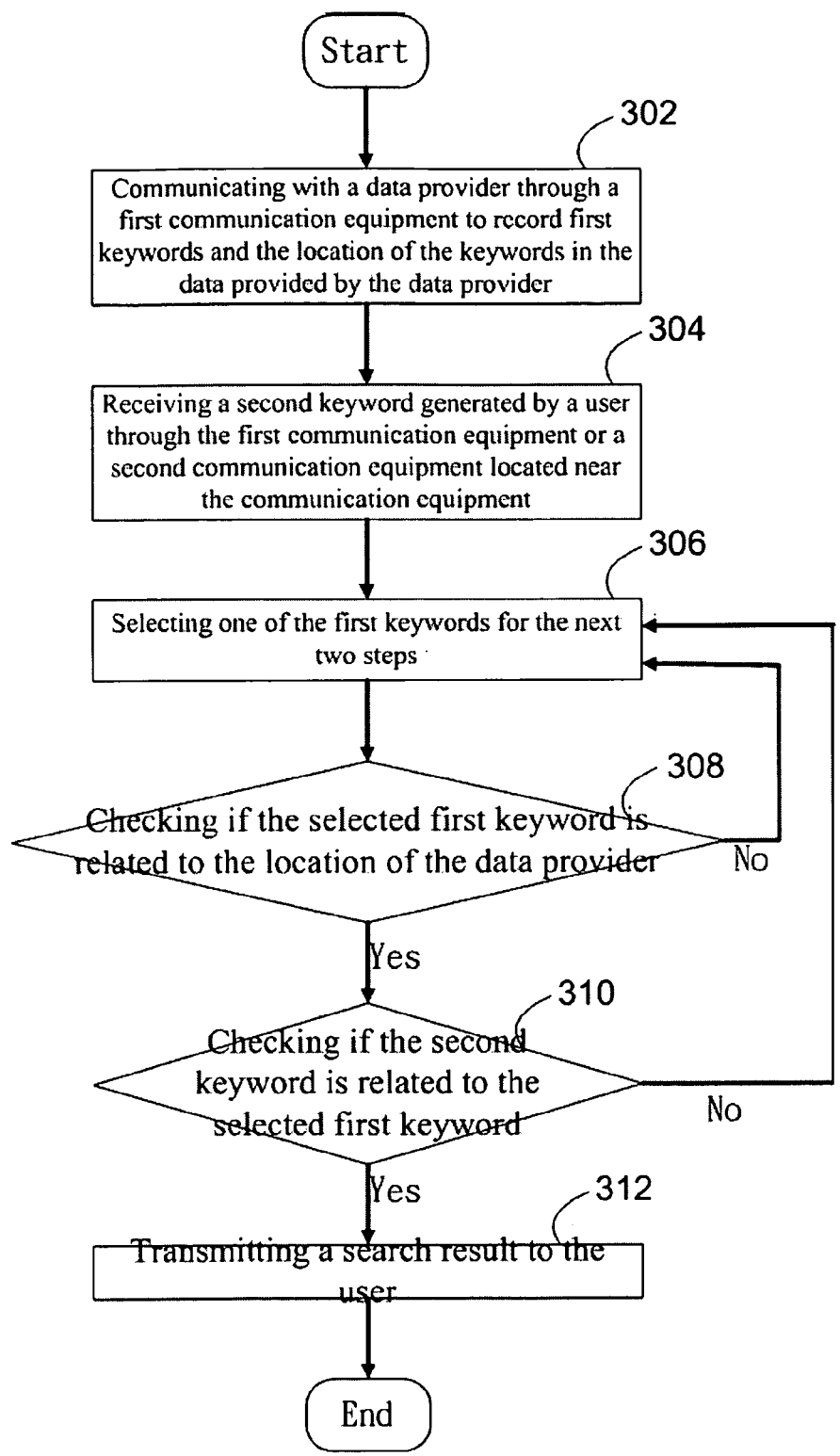
FIG. 3 is a flowchart illustrating a method of providing a location-based service according to another example of the present invention.

FIG. 3 is a flowchart illustrating a method of providing a location-based service according to another example of the present invention. Referring to FIG. 3, at step 302, a location-based service provider may communicate with a data provider through a first communication equipment to record first keywords and the location of the keywords in the data provided by the data provider, wherein the data is related to an indicator. In one example, the data may be a web page. At step 304, the location-based service provider may receive a second keyword generated by a user through the first communication equipment or a second communication equipment located near the communication equipment. Next, at step 306, the location-based service provider may select one of the first keywords for the next two steps. Then, at step 308, the location-based service provider may check if the selected first keyword is related to the location of the data provider. If yes, goes to step 310, and return to step 306 if no. At step 310, the location-based service provider may check if the second keyword is related to the selected first keyword. If yes, goes to step 312, and return to step 306 if no. Finally, at step 312, the location-based service provider may treat the selected first keyword and its related data as a search result and transmit the search result to the user. The first communication equipment or the second communication equipment located closely to the first communication equipment may include a base station, a relay station, a subscriber station and/or a mobile station, wherein the second communication equipment may be located in the same cell, the same group and/or the same range of the light-of-sight (LOS) of the first communication equipment. In one example, the keyword may be formed by editing through an input method or transforming through a voice input. In another example, the keyword may be formed by selecting a plurality of choices provided by the location-based service provider for a user to select at least one of the plurality of the choices to form the query. Those skilled in the art can easily understand that the present invention is not limited to the exact order of the steps shown in FIG. 3. In other example, the location-based service provider may check if data is related to its data provider firstly and then record a keyword and the location where the keyword appears in the data.

Figure 4:
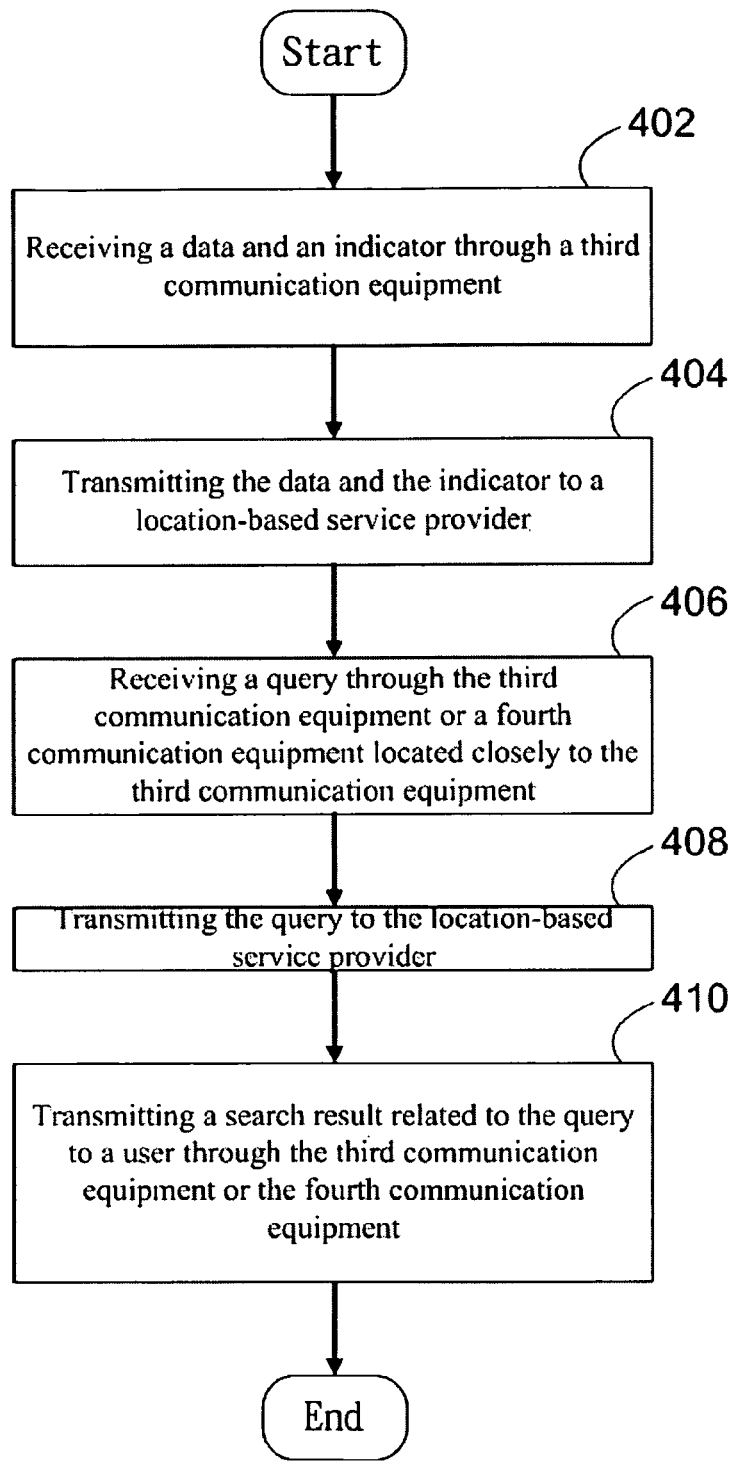
FIG. 4 is a flowchart illustrating a method of providing a location-based service according to still another example of the present invention.

FIG. 4 is a flowchart illustrating a method of providing a location-based service according to still another example of the present invention. Referring to FIG. 4, at step 402, a system provider may receive a data and an indicator through a third communication equipment, wherein the data is related to the indicator and the indicator is configured to indicate if the data is related to the location of a provider of the data. Then, at step 404, the system provider may transmit the data and the indicator to a location-based service provider. Next, at step 406, the system provider may receive a query through the third communication equipment or a fourth communication equipment located closely to the third communication equipment. At step 408, the system provider may transmit the query to the location-based service provider. Finally, at step 410, the system provider may transmit a search result related to the query to a user through the third communication equipment or the fourth communication equipment, wherein the search result is formed by searching a plurality of data received by the third equipment to find data related to the location of the provider and also related to the query. The third communication equipment or the fourth communication equipment located closely to the third communication equipment may include a base station, a relay station, a subscriber station and/or a mobile station, wherein the fourth communication equipment may be located in the same cell, the same group and/or the same range of the light-of-sight (LOS) of the third communication equipment. In one example, the query such as a keyword may be formed by editing through an input method or transforming through a voice input. In another example, the query may be formed by selecting a plurality of choices provided by the location-based service provider for a user to select at least one of the plurality of the choices to form the query. Moreover, the location-based service provider may firstly store data whose related indicator indicating the data is related to the location of the provider of the data into a location-based service server.

Figure 5:
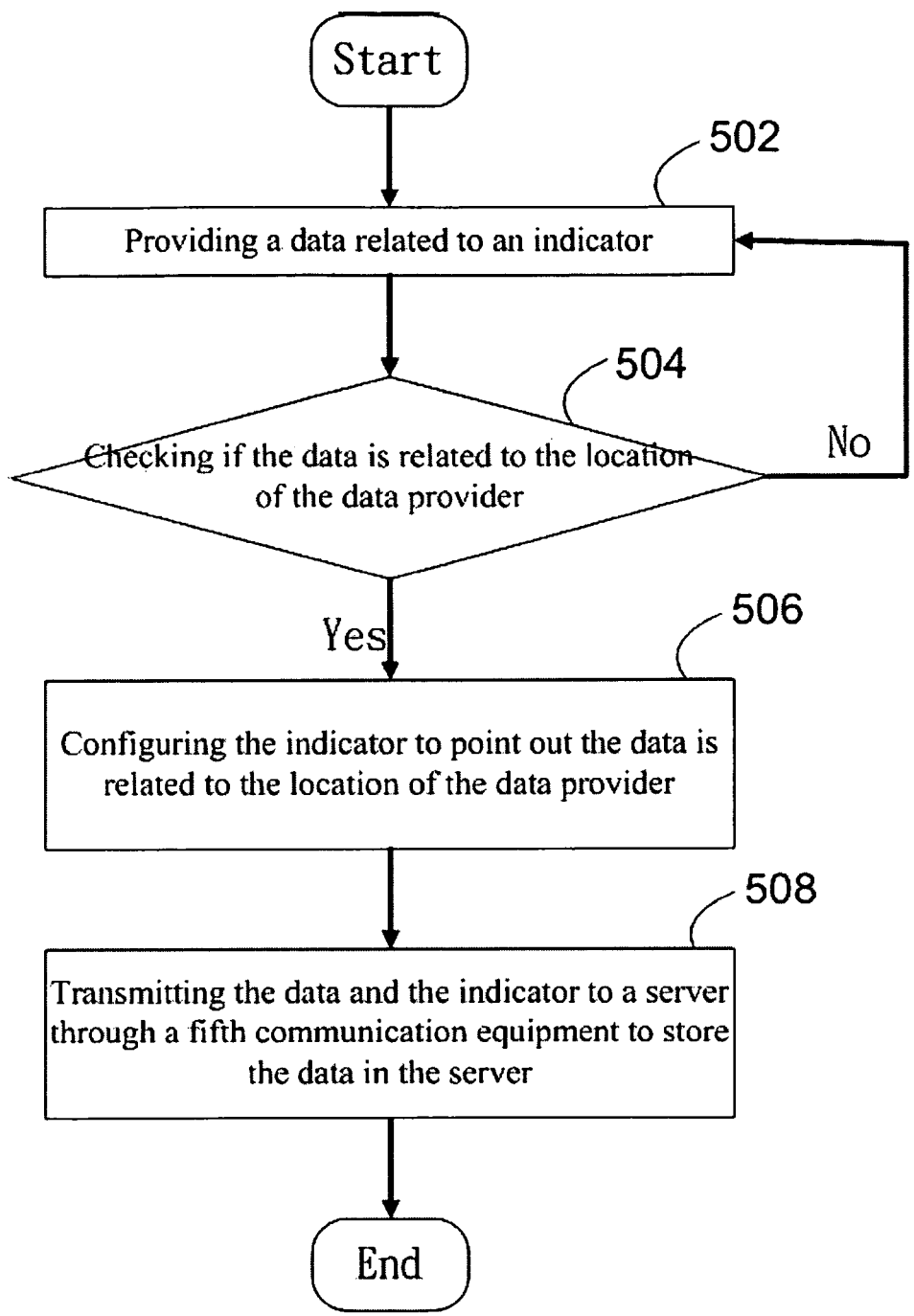
FIG. 5 is a flowchart illustrating a method of providing a location-based service according to yet another example of the present invention.

FIG. 5 is a flowchart illustrating a method of providing a location-based service according to yet another example of the present invention. Referring to FIG. 5, at step 502, the data provider may provide a data related to an indicator. At step 504, the data provider may check if the data is related to the location of the data provider. If yes, go to step 506, and return to step 502 if no. At step 506, the data provider may configure the indicator to point out the data is related to the location of the data provider if the data is related to the location of the data provider. Finally, at step 508, the data provider may transmit the data and the indicator to a server through a fifth communication equipment to store the data in the server for a user to transmit a query to search the data related to the location of the provider of the data through the fifth communication equipment or a sixth communication equipment located closely to the fifth communication equipment. The fifth communication equipment or the sixth communication equipment located closely to the fifth communication equipment may include a base station, a relay station, a subscriber station and/or a mobile station, wherein the sixth communication equipment may be located in the same cell, the same group and/or the same range of the light-of-sight (LOS) of the third communication equipment. In one example, the query such as a keyword may be formed by editing through an input method or transforming through a voice input. In another example, the query may be formed by selecting a plurality of choices provided by the location-based service provider for a user to select at least one of the plurality of the choices to form the query. Moreover, the location-based service provider may firstly store data whose related indicator indicating the data is related to the location of the provider of the data into a location-based service server.

Figure 6:
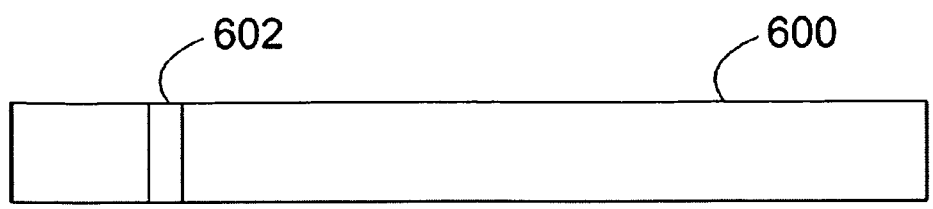
FIG. 6 is a diagram illustrating a data 600 and an indicator 602 according to an example of the present invention.

FIG. 6 is a diagram illustrating a data 600 and an indicator 602 according to an example of the present invention. Referring to FIG. 6, the data 600 may be a frame, a signal, a message or a single piece of data. The indicator 602 may be a bit or a code included in the data 600. The indicator 602 may be configured to different statuses (e.g. 0 or 1 if the indicator 602 is a single bit) to indicate that the data 600 is related to the location of a provider who provides the data 600 or not.

Figure 7:
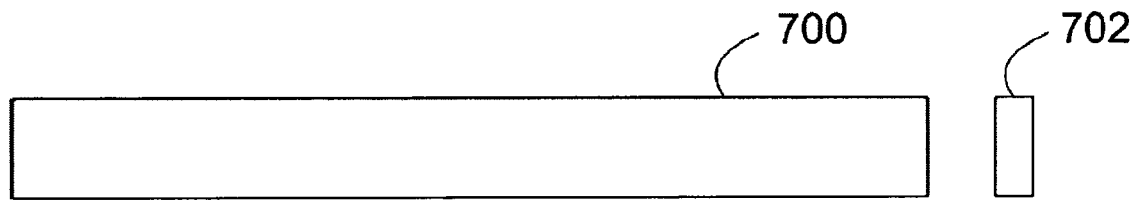
FIG. 7 is a diagram illustrating a data 700 and an indicator 702 according to an example of the present invention.

FIG. 7 is a diagram illustrating a data 700 and an indicator 702 according to an example of the present invention. Referring to FIG. 7, the data 700 may be a frame, a signal, a message or a single piece of data. The indicator 702 may be transmitted following or in company with the data 700. The indicator 702 may be configured to different statuses (e.g. 0 or 1 if the indicator 702 is a single bit) to indicate that the data 700 is related to the location of a provider who provides the data 700 or not.

Figure 8:
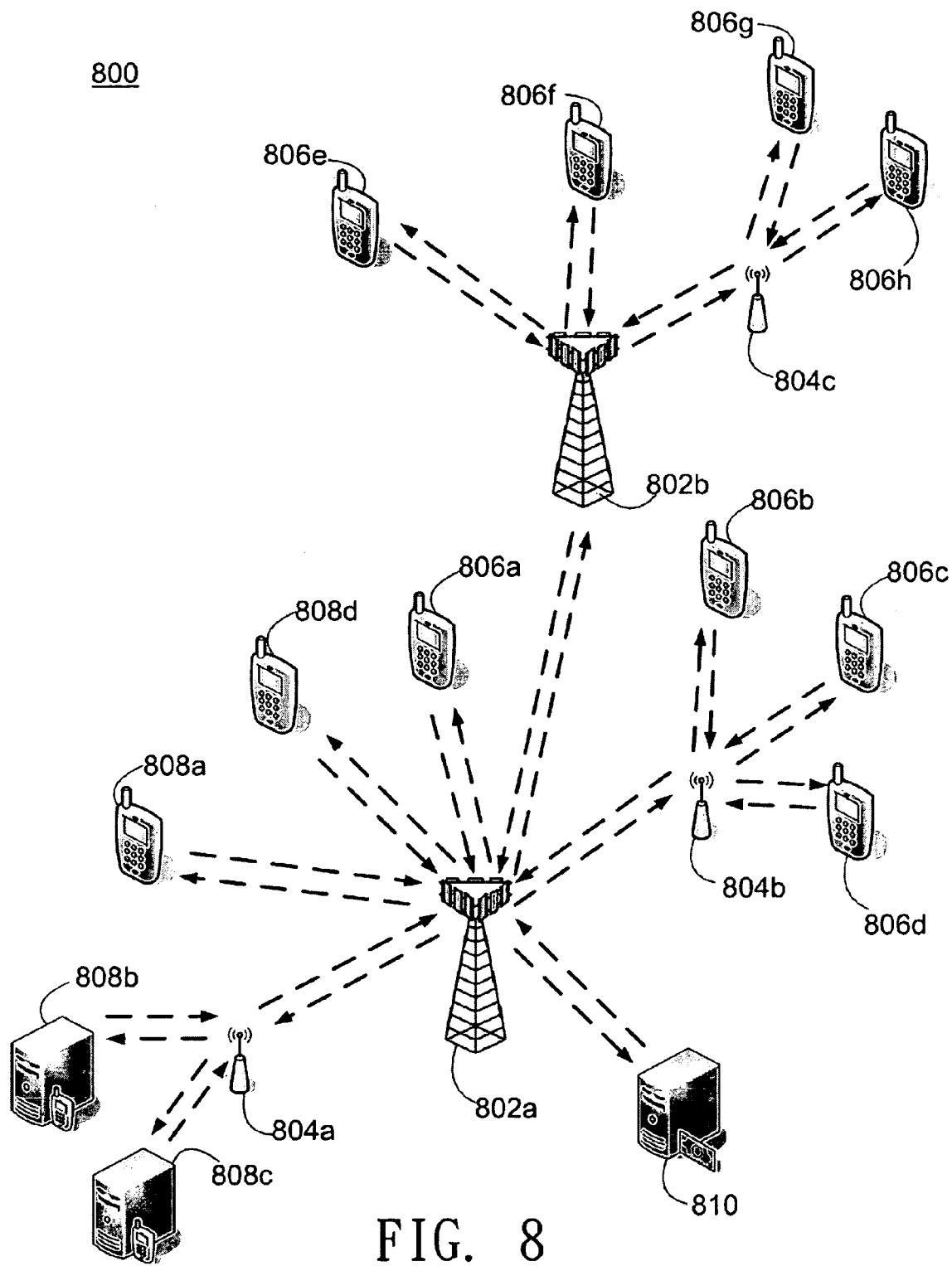
FIG. 8 is a diagram illustrating a communication system 800 according to other example of the present invention.

FIG. 8 is a diagram illustrating a communication system 800 according to other example of the present invention.

Referring to FIG. 8, the communication system 800 may include base stations 802a and 802b, relay stations 804a, 804b and 804c, mobile stations 806a, 806b, 806c, 806d, 806e, 806f, 806g and 806h, data providers 808a, 808b, 808c and 808d, and a location-based service provider 810. The base stations 802a/802b is capable of assigning a communication address information to a relay station or a mobile station within the cells of the base stations 802a/802b, respectively, and thus each of the relay stations 804a, 804b and 804c and the mobile stations 806a, 806b, 806c, 806d, 806e, 806f, 806g and 806h has its own communication address information. A user may communicate with the location-based service provider 810 by using the mobile stations 806a, 806b, 806c, 806d, 806e, 806f, 806g and 806h to get its service. In one example, a query generated by the user may be transmitted to the base station 802a through the mobile station 806a, and then the query may be passed to the location-based service provider 810 through the base station 802a. In another example, a query of a user may firstly be transmitted to the relay station 804b through the mobile stations 806b, 806c or 806d, and then passed to the base station 802a. Finally, the query is transmitted to the location-based service provider 810 by the base station 802a. In still another example, a query of a user may firstly be transmitted to the relay station 804c through the mobile stations 806e, 806f, 806g or 806h and then passed to the base station 802b. The base station 802b may pass the query to the base station 802a. Finally, the query is transmitted to the location-based service provider 810 by the base station 802b.

Similarly, data of the data provider 808a or 808b may firstly be transmitted to the base station 802a and then passed to the location-based service provider 810 through the base station 802a. Moreover, data of the data provider 808b or 808c may firstly be transmitted to the relay station 804a. Next, the query may be passed to the base station 802a, and then passed to the location-based service provider 810 through the base station 802a.

In one example, the data provider 808a may transmit a first data related to the location of the data provider 808a, for example, the data provider 808a may belong to a store, and the owner of the store wants mobile stations near the store can search the information related to the store such as sales or products. The data provider 808a may firstly set an indicator of the first data to indicate that the first data is related to the location of the data provider 808a. Then the data provider 808a may transmit the first data to the location-based service provider 810. Once the location-based service provider 810 receives the first data and finds the first data is related to the location of the data provider 808a by checking its indicator, the location-based service provider 810 may record the first data and a first address information related to the data provider 808a to form a second data, and store the second data into a location-based service server. In another example, a first data may be provided by a plurality of data providers, and the location-based service provider 810 may record the first data and a plurality of address information related to the plurality of data providers accordingly to form the second data. In this example, mobile stations in the coverage of each of the plurality of data providers may be capable of search or receive the second data.

In one example, if a user send a query with the mobile station 806a, the location-based service provider 810 may get a second address information related to the mobile station 806a, and then select a selected data related to the query from a plurality of the second data stored in the location-based service server such that the first address information of the selected data is related to the second address information of the mobile station 806a. Finally, the location-based service provider 810 may transmit the selected data to the mobile station 806a as a search result to the query.

In one example, the address information, the first address information and the second address information comprise at least one of an IP address, a mobile IP address or an Identifier (ID). In another example, the query such as a keyword may be formed by editing through an input method or transforming through a voice input. In another example, the query may be formed by selecting a plurality of choices provided by the location-based service provider for a user to select at least one of the plurality of the choices to form the query. In other example, the location-based service provider 810 may update the first address information related to the first data if the data provider 808a of the first data communicates to another base station or relay station when the data provider 808a leaves the coverage of its original base station or relay station and enters the coverage of a new base station or relay station.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

I claim:

1. A location-based service method, comprising:
receiving a plurality of data through a first communication equipment, wherein each of the plurality of data is related to an indicator, the indicator being configured to indicate if the data is related to a location of a provider of the data;
storing data whose related indicator indicating the data is related to the location of the provider of the data into a location-based service server;
receiving a query through the first communication equipment or a second communication equipment located closely to the first communication equipment; and
searching the plurality of data, based on the indicator related to each of the plurality of data, to find data related to the location of the provider and also related to the query to form a search result related to the query,
wherein the searching the plurality of data to find data related to the location of the provider and also related to the query to form a search result related to the query is to search the data stored in the location-based service server and find data related to the query.

2. The method of claim 1, wherein the first communication equipment and the second communication equipment including at least one of a base station, a relay station, a subscriber station or a mobile station.

3. The method of claim 1, wherein the data includes the indicator.

4. The method of claim 1, wherein the query comprises a key word formed by editing through an input method or transforming through a voice input.

5. The method of claim 1, wherein the receiving a query through the first communication equipment or a second communication equipment located closely to the first communication equipment further comprising:

provic a plurality of choices for a user to select at least one of the plurality of the choices to form the query.

* * * * *